United States Patent [19]

Braun

[11] Patent Number: 4,850,236

[45] Date of Patent: Jul. 25, 1989

[54] VEHICLE DRIVE LINE SHIFT CONTROL SYSTEM AND METHOD

[75] Inventor: Eugene R. Braun, Royal Oak, Mich.

[73] Assignee: Eaton Corporation, Cleveland, Ohio

[21] Appl. No.: 123,504

[22] Filed: Nov. 20, 1987

[51] Int. Cl.⁴ .......................... B60K 41/10; F16H 5/52
[52] U.S. Cl. ........................................ 74/337; 74/858
[58] Field of Search .................. 74/857, 858, 872, 337

[56] References Cited

U.S. PATENT DOCUMENTS

| | | | |
|---|---|---|---|
| 2,451,058 | 10/1948 | Bennetch | 74/858 |
| 2,481,997 | 9/1949 | Haigh et al. | 74/872 X |
| 3,105,395 | 10/1963 | Perkins | 74/745 |
| 3,272,028 | 9/1966 | Randol | 74/858 |
| 3,335,830 | 8/1967 | De Castelet | 74/858 X |
| 3,478,851 | 11/1969 | Smyth et al. | 192/3.55 |
| 3,545,307 | 12/1970 | Bildat | 74/872 X |
| 3,799,002 | 3/1974 | Richards | 74/745 |
| 4,200,007 | 4/1980 | Espenschied et al. | 74/872 X |
| 4,324,153 | 4/1982 | Sugimoto et al. | 74/866 |
| 4,361,060 | 11/1982 | Smyth | 74/866 |
| 4,440,037 | 4/1984 | Foxton et al. | 74/477 X |
| 4,527,477 | 7/1985 | Richards | 74/745 X |
| 4,593,580 | 6/1986 | Schulze | 74/858 |
| 4,648,290 | 3/1987 | Dunkley et al. | 74/866 |
| 4,722,248 | 2/1988 | Braun | 74/866 |

FOREIGN PATENT DOCUMENTS

| | | |
|---|---|---|
| 0071353 | 2/1983 | European Pat. Off. . |
| 0170465 | 2/1986 | European Pat. Off. . |
| 0240901 | 10/1987 | European Pat. Off. . |
| 2036732 | 10/1978 | Fed. Rep. of Germany . |
| 3308525 | 9/1984 | Fed. Rep. of Germany . |
| 3605377 | 8/1987 | Fed. Rep. of Germany . |

Primary Examiner—Leslie A. Braun
Assistant Examiner—Harold F. Macris
Attorney, Agent, or Firm—H. D. Gordon

[57] ABSTRACT

A vehicular transmission shift control system is provided for effecting automatic shifting between a group of sequentially related forward gear ratios provided by the transmission that includes a logic member (16) operative to receive and process an engine speed signal (22) and a gear ratio position signal (30) and to provide an output control signal (33) to a shift actuator (34) that is operative to enable automatic shifting between the sequentially related forward gear ratios whenever the lowest sequentially related forward gear ratios of the group is manually engaged by an operator of the vehicle. Fuel to the engine is controlled (26) to cause a torque reversal across an engaged jaw clutch (80-86, 82-88, 84-90) to assure disengagement thereof without requiring disengagement of the master clutch (8).

19 Claims, 3 Drawing Sheets

VEHICLE DRIVE LINE SHIFT CONTROL SYSTEM AND METHOD

BACKGROUND OF THE INVENTION

1. Related Application

This application is related to co-pending U.S. patent application Ser. No. 850,641 filed Apr. 11, 1986, now U.S. Pat. No. 4,722,248 and titled TRANSMISSION SHIFT CONTROL SYSTEM.

2. Field of the Invention

This invention relates generally to a shift control system for vehicular drivelines and more particularly to a semi-automatic shift control system that enables automatic shifting between higher sequentially related forward gear ratios of vehicular drivelines of the types commonly employed in heavy duty trucks such as compound type mechanical transmissions or simple transmissions connected in series with the multiple speed drive axles.

3. Description of the Prior Art

Compound type transmissions and transmission connected in series with multi-speed axles have been used advantageously for many years in heavy duty truck applications where a large number of driveline gear ratios are employed in a manner to provide an efficient and smooth shifting performance over the speed range of the truck considering inertia and load factors involved. Compound transmission generally feature a combination of a main transmission section coupled in series with an auxiliary transmission section such that the number of forward change gear ratios obtainable from the combination is the product of the number of gear ratios respectively contained within the main and auxiliary transmission sections as is well known to those skilled in the art. Thus, for example, the number of gear ratios is twelve for a compound transmission in which four gear ratios are contained within the main transmission section and three gear ratios are contained within the auxiliary transmission section coupled in series with the main section.

The availability of particular gear ratios from the combination of the main and auxiliary sections of a compound type transmission have been the subject of considerable investigation in the past.

Broadly, compound transmission are operative to provide a plurality of groups containing a plurality of forward gear ratios ranging from a first group that includes the lowest gear ratio to a last or highest group that includes the highest gear ratio available from the compound transmission.

More particularly, either range type or splitter type auxiliary sections or combinations of the the two have been employed to provide particular gear shifting sequence patterns. In compound transmissions having a range type auxiliary section, the auxiliary gear ratio steps are greater than the total ratio coverage of the main transmission section and the main transmission section is shifted progressively through its ratios in each range. Examples of compound transmissions having a range type auxiliary section can be found in U.S. Pat. Nos. 2,637,221; 2,637,222; and 3,105,395, the disclosures of all of which are included herein by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 3,799,002; 4,290,515; 4,440,037; and 4,527,447, the disclosures of all of which are incorporated herein by reference.

Multiple speed drive axles of the type disclosed in U.S. Pat. Nos. 4,046,210; 4,194,586; 3,195,371 and 2,754,692, the disclosures of which are hereby incorporated by reference, are usually connected in series with simple transmissions to provide additional driveline ratios in a manner similar to an auxiliary transmission section.

In a compound transmissiong having a combined range and splitter type auxiliary section, both range and splitter type ratios are provided allowing the main section to be progressively shifted through its ratio in at least two ranges and also allowing the main section ratios to be split in at least one range. Examples of combined range and splitter auxiliary transmissions sections may be seen by reference to U.S. Pat. Nos. 3,283,613 and 3,648,546, the disclosures of which are incorporated herein by reference.

Until the recent past, compound transmissions, particularly for trucks, have historically been of the manual type requiring actuation of a master friction clutch and of shift actuator by an operator to shift between change gear ratios. Due to the large number of change gear ratios normally associated with compound transmissions, a great deal of effort was required to manually shift throughout the entire range of forward change gear ratios involved. More recently, efforts have been employed to combine manual shifting and automatic shifting under certain conditions such as disclosed in U.S. Pat. Nos. 4,208,929; 4,292,341; 4,312,248; and 4,324,153, the disclosures of all of which are incorporated herein by reference.

Also, fully or semi-automatic mechanical transmission systems, such as disclosed in U.S. Pat. Nos. 4,361,060; 4,527,447 and 4,648,290, the disclosures of which are incorporated by reference, have been developed.

Although a great deal of effort has been expended in the recent past to reduce operator fatigue and improve fuel economy, no one prior to the present invention had thought to provide a compound type vehicle driveline, such as a compound type mechanical transmission with a relatively simple and inexpensive shift control system that enabled manual shifting of lower gear ratios whilst enabling automatic shifting between particularly sequentially related higher gear ratios to relieve the operator of shifting burden under higher speed highway driving conditions and allow an automatic shift schedule for fuel economy.

SUMMARY OF THE INVENTION

In accordance with the present invention, a relatively simple and inexpensive driveline control system for automatically shifting between certain sequentially related driveline ratios, and not requiring controllers or actuators for the vehicle master clutch, is provided.

The above is accomplished by providing sensors for providing inputs to a controller for determining if automatic shifting in the sequentially related gear ratios is required and for issuing command output signals to actuators to implement a commanded driveline gear ratio change.

Preferably, only a fuel control and a relatively simple transmission or axle shift control actuator is required to provide high gear group automatic shifting in a normally manually shifted vehicle driveline.

The controller causes the engine fuel supply to be increased and decreased, possibly repeatedly, while actuators urge the existing engaged ratio jaw clutch assembly toward disengagement, to create a torque break sufficient for disengagement. The control will then cause the about to be engaged jaw clutch members to rotate at a substantially synchronous speed allowing relatively smooth engagement thereof with the master clutch remaining engaged.

Accordingly, it is an object of this invention to provide a relatively simple shift control system and method for a vehicular driveline, such as a transmission of the compound type, that provides both the simplicity and performance associated with manual gear shifting in lower gear ratios and the convenience and fuel economy of automatic shifting between sequentially related higher gear ratios of the transmission which is particularly advantageous in a multi-speed compound 9, 12, 13, 16 or 18 forward speed transmission utilized in an over the road truck to enable the truck to cruise at higher speeds without requiring manual shifting while maintaining fuel efficient gear ratios.

It is another object of this invention to provide a relatively simple and inexpensive vehicle driveline shift control system and method that provides low cost manual starting and lower gear ratio shifts in combination with the convenience and fuel economy of automatic shifting at higher gear ratios while not requiring automatic engagement and disengagement of the vehicle master clutch.

These and other objects and advantages of the present invention will become apparent from a reading of the description of the preferred embodiment taken with the drawings.

DESCRIPTION OF THE PREFERRED EMBODIMENTS

Figure 1:
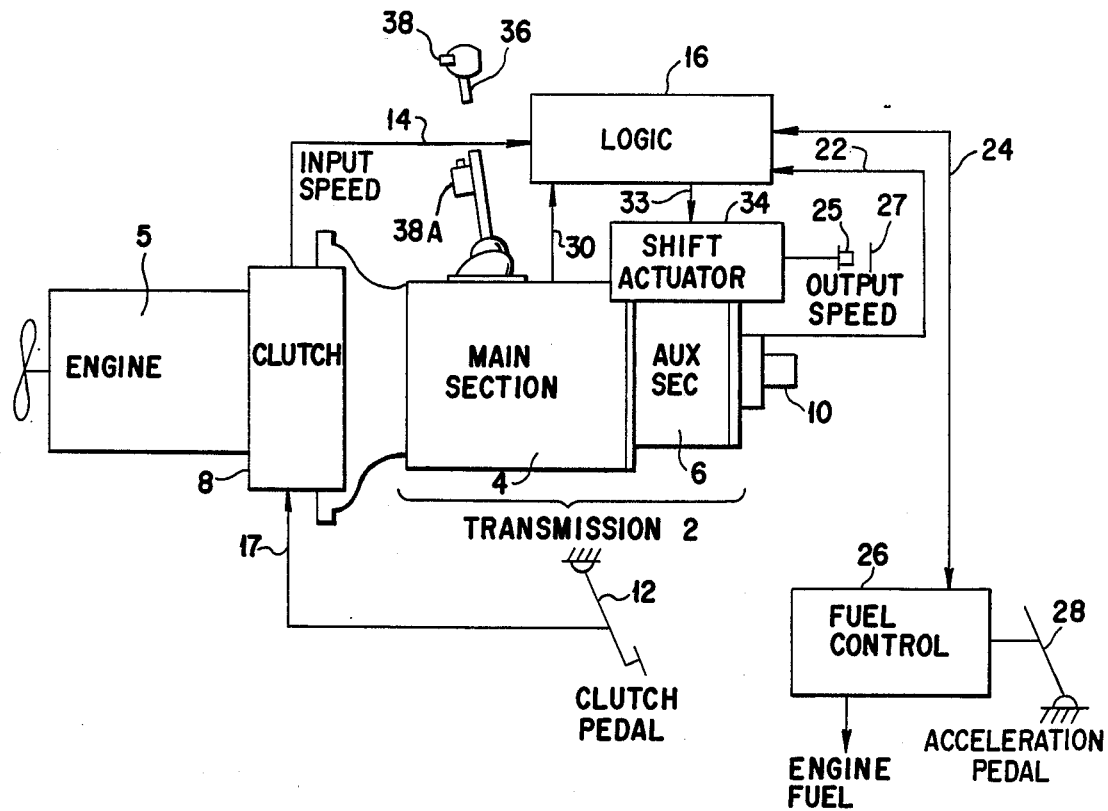
FIG. 1 shows a block diagram of semi-automatic compound transmission embodiment of the shift control system of the invention.

FIG. 1 shows a compound type mechanical transmission 2 comprising a main section 4 coupled in series to an auxiliary section 6 controlled by the shift control system of the invention. Main section 4 is operatively coupled to the drive shaft of the vehicle engine 5 by master friction clutch 8 and output shaft 10 of auxiliary section 6 is operatively coupled, commonly by means of a drive shaft and a drive axle, to the drive wheels of the vehicle (not shown). It is understood that a multiple speed drive axle could be substituted for, or used in connection with, auxiliary section 6.

The change gear ratios available from transmission 2 are manually selectable by first depressing clutch pedal 12 to disengage the engine drive shaft and then positioning shift lever 36 according to the shift pattern prescribed to engage the particular change gear ratio of main section 4 desired and thence, in the event the particular gear ratio desired is contained within auxiliary section 6, by operation of one or more actuators such as electrical shift button 38 or fluid actuating valve 38A to provide a signal operative to effect the engagement within auxiliary section 6 desired as is well known to those skilled in the operation of compound type transmissions.

Figure 3:
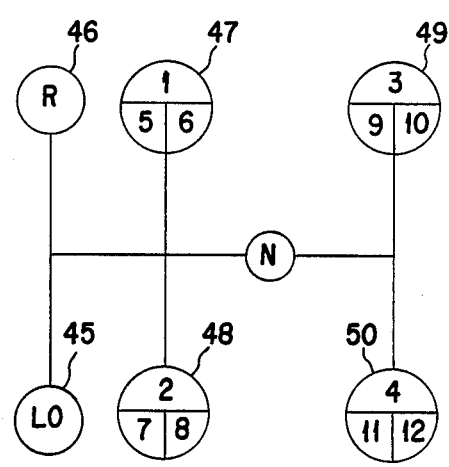
FIG. 3 shows another shifting pattern for a compound transmission having a combination of a range and splitter type auxiliary section for which the shift control system of the invention may be employed.

For the purpose of this invention, the term "group" as used herein shall mean the particular plurality of gear ratios available from a vehicular transmission and particularly from a compound type transmission when a particular gear ratio is manually selected by an operator and the term "sequentially related" as used herein shall mean between gear ratios available within the group selected provided there is no intervening gear ratio available within another group such as, for example, shown in group 50 of FIG. 3 where automatic shifting is effected between gear ratios 11 and 12 but not between gear ratio 4 and 11 or 12 since other groups contain gear ratios intermediate to gear ratios 4 and gear ratios 11 and 12. Generally, the transmission is of the type having a plurality of forward gear ratios of which one group selectable by the operator is sequentially related and less than the total number of gear ratios provided by the transmission and automatic shifting is effected between at least two of the sequentially related gear ratios.

Figure 2:
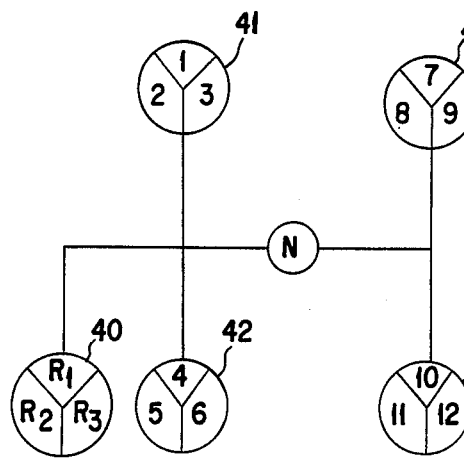
FIG. 2 shows a block diagram of a shifting pattern for a compound transmission having a splitter type auxiliary section for which the shift control system may be employed.

Preferably, all of the gear ratios except the highest and those sequentially related to the highest in the group including the highest gear ratio, as hereinafter described with respect to FIGS. 2 and 3, are manually selectable by the operator by depressing clutch pedal 12 to cause clutch 8 to disengage transmission 2 from the engine drive member to allow lever 36 to move to the neutral position, then to re-engage clutch 8 and manipulate fuel to engine 5 to cause synchronous or substantially synchronous rotation of the clutch members of the jaw clutch selected to be engaged and then to again disengage clutch 8 and then position shift lever 36, and actuate button 38 if required, and thence, upon engagement of the desired change gear ratio, release pedal 12. Although not recommended, certain experienced skilled drivers can accomplish smooth gear changes without the second clutch disengagements of the recommended "double clutching" method.

The shift control system of the invention is operative to initiate and enable automatic shifting between at least the sequentially related gear ratios within the highest group and preferably between all sequentially related gear ratios within each group whenever the lowest gear ratio included within the group is selected by the operator.

The control system of the invention includes means for sensing and providing a suitable signal 33 to actuator means 34 operative to enable automatic shifting at the particular gear position desired. The means operative to enable automatic shifting includes logic circuitry 16 (preferably microprocessor based), fuel control means 26 and shift actuator 34. Logic circuitry 16 is operative to receive and operate upon information including input shaft speed signal 14, gear ratio position signal 30, output shaft speed signal 22, and an input signal 24 indicative of accelerator pedal position 28 to initiate and provide automatic shifting as required by the invention. Generally, automatic shifting is accomplished by shift actuator 34 including valves and the like well known to those skilled in the art according to the nature of a command output signal 33 received from logic circuitry 16 and by automatic fuel control 26 according to the command output signal 24.

Examples of actuators 34 and 26 may be seen by reference to U.S. Pat. Nos. 4,445,393, 4,474,083 and 4,614,126, the disclosures of which are incorporated herein by reference.

The above described means by which automatic shifting is effected is well known to those skilled in the art excepting that it becomes operable only when one of the gear ratios included in at least the group including the highest gear ratio is manually engaged by the operator. Examples of such automatic shifting may be appreciated in greater detail by reference to U.S. Pat. Nos. 4,648,290; 4,361,060; 4,527,447; and 3,478,851, the disclosures of all of which are incorporated herein by reference.

Examples of the operation of the shift control system of the invention in conjunction with specific shift sequence patterns for a compound transmission is hereinafter described with respect to FIGS. 2 and 3.

FIG. 2 shows shifting pattern sequence for a compound transmission having a splitter-type auxiliary section in which all of the gear ratios within each group are sequentially related. Transmissions of this type can be seen in greater detail by reference to published European Patent Applications EP-A-0071353 and EP-A-0117342, the disclosures of which are incorporated herein by reference.

The forward gear ratios are divided into groups 41-44 in addition to neutral position "N" and reverse gear ratio group 40 which includes three reverse gear ratios $R_1$; $R_2$; and $R_3$. The groups represent the combination of gear ratios available both from main section 4 of the compound transmission according to the position of shift arm 36 as well as the gear ratios available from the auxiliary section by actuation of button 38 and the like once the gear ratio in section 4 has been engaged as is well known to those skilled in the art. In FIG. 2, the lowest gear ratio is "1" contained in group 41 from which sequentially related gear ratios "2" and "3" may then be engaged by the operator actuating an actuator such as button 38 or fluid actuating valve 38A as the case may be. When the operator shifts arm 36 to gear ratio 4 of group 42, then sequentially related gear ratios 5 and 6 become available by an act of the operator such as actuation of button 38 or valve 38A and so on through the forward gear sequence pattern.

The highest gear ratio 12 is included in group 44 which also includes sequentially related lower gear ratios 10 and 11. Thus, when the operator manually engages forward gear ratio 10, 11 or 12 by positioning shift arm or lever 36, such is indicated by signal 30 which causes implementation of automatic shift control amongst gear ratios 10, 11 and 12 since they are all sequentially related.

Figure 4:
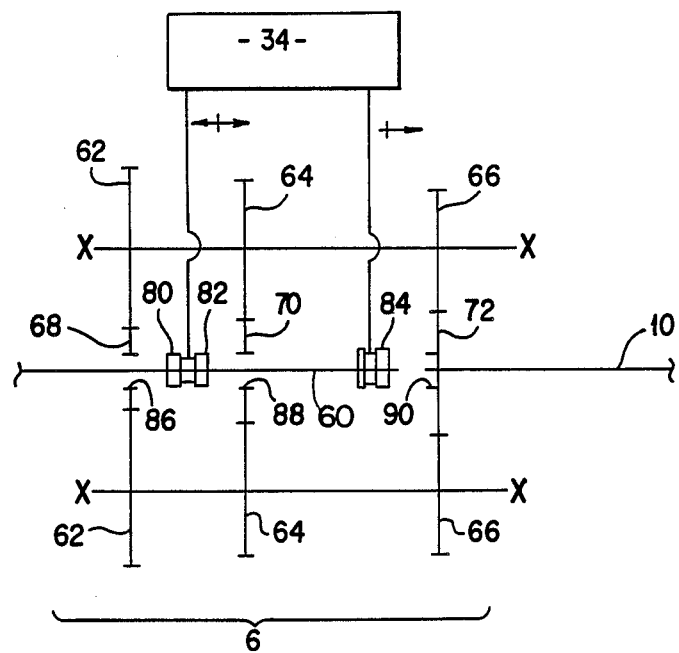
FIG. 4 is a schematic illustration of the auxiliary transmission section of a splitter type compound transmission.

FIG. 4 is a schematic illustration of the auxiliary section 6 of a splitter type compound transmission. A shaft 60 is driven by the main section 4 gearing, and thus by the engine 5, and is coaxial with output shaft 10.

Auxiliary countershaft gears 62, 64 and 66 are constantly meshed with auxiliary section ratio gears 68, 70 and 72, respectively. Gear 72 is rotationally fixed to output shaft 10.

Clutch members 80, 82 and 84 are rotationally fixed to shaft 60, as by splines or the like, and are engagable with clutch members 86, 88 and 90, respectively, to clutch gears 68, 70 and 72, respectively, to shaft 60. Clutch members 80, 82 and 84 are axially moved, and thus controlled, by actuator 34.

Clutch members 80, 82 and 84 are rotatable at a rotational speed which is a function of the gear ratio of main section 10 and, of the rotational speed of the engine 5. Clutch members 86, 88 and 90 rotate at a speed which is a function of output shaft 10 speed which is a function of vehicle speed. During a typical shift the vehicle speed, and thus the rotational speed of clutch members 86, 88 and 90, will remain substantially constant.

FIG. 3 shows a combination of range/splitter type compound transmission shifting sequence pattern. The pattern includes a single reverse gear position "R" for shift arm 36 as well as low ("lo") gear ratio position 45. The pattern further includes forward gear ratio groups 47-50 in addition to neutral position "N". In FIG. 3, the gear ratios within groups 47-50 are not all sequentially related.

In FIG. 3, when the operator selects low range, gear ratios "R", "LO", 1, 2, 3 and 4 become available by manually shifting lever 36. When the operator selects high range by operation, for example, of valve 38A, sequentially related ratios 5 and 6 become available when the operator manually engages the number 1 gear position of group 47 and so on. Once the operator manually engages the number 4 gear position in group 50, then automatic shifting is effected between sequentially related gear ratios 11 and 12 according to the invention. Similarly, automatic shifting is effected between gear ratios 9 and 10 once the operator manually selects gear position 3 of group 49 and between gear ratios 7 and 8 once the operator manually selects gear position 2 of group 48.

In addition to the advantages associated with automatic shifting between sequentially related higher gear ratios, the shift control system of the invention may further include means for limiting engine speed in the higher gear ratios such as, for example, for gear ratios 11 and 12 of group 50 of FIG. 3 and even lower sequentially related gear ratios for which automatic shifting is effected for purposes of fuel economy and the like. Such may be effected for example by the shift control system disclosed in my co-pending application by triggering a throttle stop or engaging a governor to limit fuel supply provided by fuel control 26 of FIG. 1 for particularly sequentially related gear ratios for which automatic shifting is effected by the control system of the invention.

Additionally, means for controlling engine and vehicular ground speed about a desired value (commonly called "cruise control") may be included independently or in conjunction with the shift control system for the invention for operating within the speed ranges provided by the sequentially related higher gear ratios for which automatic shifting is effected by the shift control system of the invention and which may be incorporated as part of fuel control 26 of FIG. 1.

Understandably, there may be situations where it is desired to manually shift amongst all of the gear ratios and, for such reason, the shift control system of the invention preferably includes means for rendering the control system inoperative when desired by an event such as actuation of a switch 25 by the operator shown in FIG. 1 or by some other event such as a signal operable to control system of the invention and enable manual rather than automatic shifting amongst all of the higher gear ratios of the transmission in addition to preferably including means indicating that conversion to manual shifting has been actuated for purposes of record and the like such as, for example, by having to break or displace a seal 27 or other type of barrier as shown in FIG. 1 to effect the disengagement of the shift control system of the invention.

Figure 5:
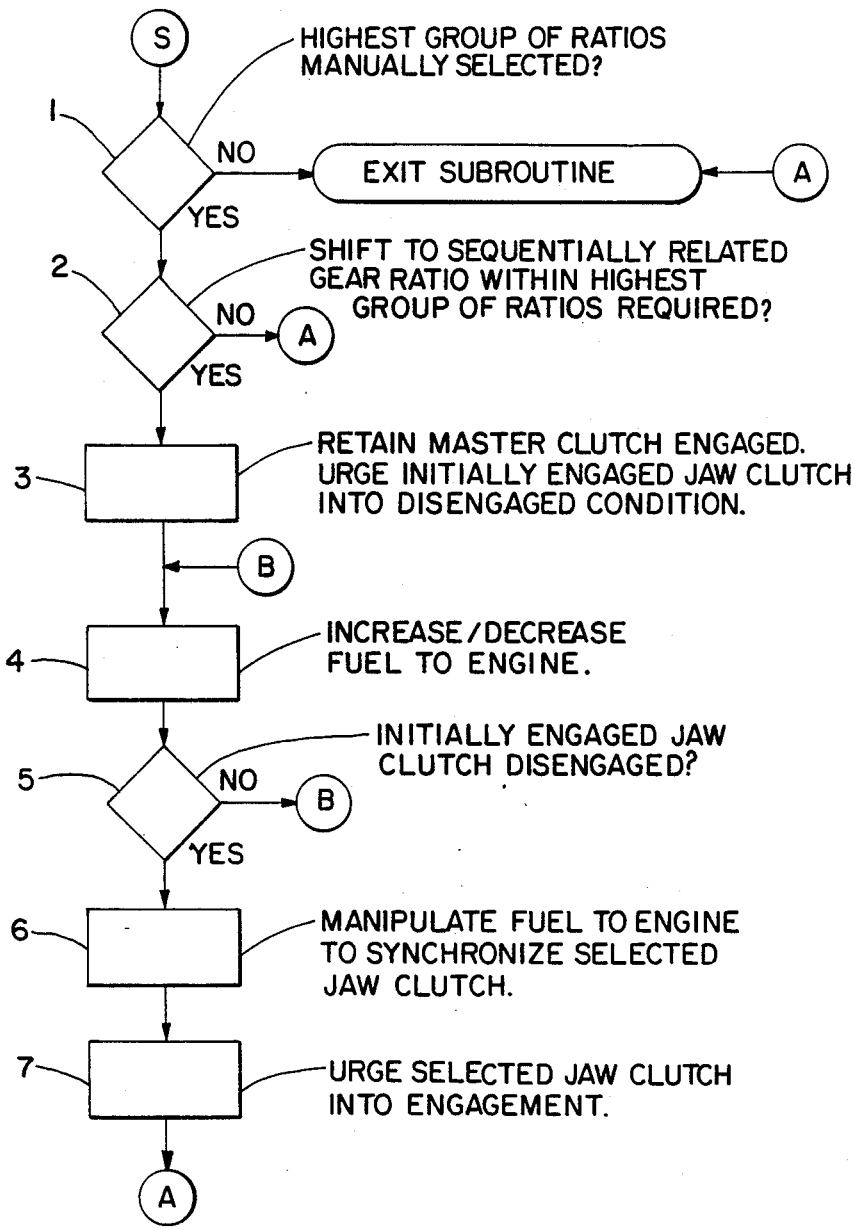
FIG. 5 is a schematic illustration, in the form of a flow chart, of the control system/method of the present invention.

To perform an automatic shift within the highest gear group (i.e., in the example of FIG. 2, a 10-11, 11-10, 11-12 or 12-11 shift), the sequence or control method shown in FIG. 5 is commanded by logic unit 16. Steps 1 and 2 determine if the aforementioned type of shift is to take place. For purposes of example, assume an automatic shift from 11th and 12th speed shift is required in holding with the invention clutch 8 remains engaged (step 3). Referring to FIG. 4, disengagement of jaw clutch 82-88 and then engagement of jaw clutch 84-90 is required.

Actuator 34 will urge clutch members 82 and 88 axially apart. The rotational speed of clutch member 88 and gear 70 are dependent upon speed of the vehicle which, during a typical shift transient, is substantially constant. The engine 5 is momentarily given increased fuel to increase the rotational speed to cause the clutch 82 to drive clutch 88, then decreased fuel to slow the engine whereby the clutch 88 will drive clutch 82 (step 4). During the forced torque reversal, there will be, for at least an instant, a break in torque transfer across clutch 82-88 allowing disengagement of same. This is sensed at step 5 where a decision is made to proceed with the control sequence only once this disengagement occurs.

After clutch 82-88 is disengaged, and disengagement is verified (i.e. when input speed does not equal output speed divided by last engaged gear ratio or by a neutral position sensor), the fuel to engine is controlled by controller 26 to cause clutch members 84 and 90 to rotate at a substantially synchronous speed (step 6). Upon achieving substantially synchronous conditions, sensed by signals 14 and 22, control 6 causes actuator 34 to bring clutch members 84 and 90 into positive engagement (step 7).

Although the present invention has been set forth with a certain degree of particularity, it is understood the various modifications are possible without departing from the spirit and scope of the invention as hereinafter claimed.

I claim:

1. A shift control system for a vehicular drive train having a plurality of groups of forward gear ratios ranging from a first group including a lowest gear ratio to a highest group including a highest gear ratio with each of said groups having at least one gear ratio manually selectable by an operator and with at least said highest group including a plurality of sequentially related gear ratios, said drive train including actuator means enabling automatic shifting between the sequentially related gear ratios of at least said highest group, and said control system including means for sensing at least when one of the sequentially related gear ratios of said highest group is manually selected by the operator and operable to enable the actuator means to effect automatic shifting between the sequentially related gear ratios within said highest group when one of the sequentially related gear ratios within said highest group is manually selected by the operator, gear ratio shifts in said highest group comprising the sequence of disengaging a first positive clutch and then engaging a second positive clutch, both of said positive clutches comprising a first clutch member (80, 82, 84) having a rotational speed determined by the rotational speed of the vehicle engine and a second clutch member (86, 88, 90) having a rotational speed determined by vehicle speed, said system characterized by:
   means to automatically increase fuel to the engine to cause the first clutch member of the first positive clutch to rotate with a value of torque greater than the value of torque with which the second clutch member of said first positive clutch rotates to cause said first clutch member of said first positive clutch to drive said second clutch member of said first positive clutch and to decrease the supply of fuel to the engine so that the second clutch member of said first positive clutch is driving said first clutch member of said first clutch, and
   means to urge said first and second members of said first positive clutch into disengagement until disengagement thereof is sensed.

2. The control system of claim 1 wherein said vehicular drive train is a compound transmission having a main section connected in series with an auxiliary section including splitter gearing, said manual selection of one of the sequentially related highest gear ratios of said highest group comprising a main section gear ratio change and said automatic shifting between the highest sequentially related gear ratios within said highest group comprising only auxiliary section shifting.

3. The control system of claim 1 further comprising means, effective after disengagement of said first positive clutch is sensed, to manipulate the supply of fuel to the engine to cause the first and second members of said second clutch to rotate at a substantially synchronous speed and to then urge said second positive clutch members into engagement.

4. The control system of claim 2 further comprising means, effective after disengagement of said first positive clutch is sensed, to manipulate the supply of fuel to the engine to cause the first and second members of said second clutch to rotate at a substantially synchronous speed and to then urge said second positive clutch members into engagement.

5. The control system of claim 1 wherein said means to automatically increase and decrease the supply of fuel to the engine is effective to first cause said first clutch member of said first positive clutch to drive the second clutch member thereof and to then cause said second clutch member of said first positive clutch to drive the first clutch member thereof.

6. The control system of claim 3 wherein said means to automatically increase and decrease the supply of fuel to the engine is effective to first cause said first clutch member of said first positive clutch to drive the second clutch member thereof and to then cause said second clutch member of said first positive clutch to drive the first clutch member thereof.

7. The control system of claim 4 wherein said means to automatically increase and decrease the supply of fuel to the engine is effective to first cause said first clutch member of said first positive clutch to drive the second clutch member thereof and to then cause said second clutch member of said first positive clutch to drive the first clutch member thereof.

8. A multiple step shift control method for controlling the shifting of a highest gear group of a vehicular drive train including a vehicular master clutch and a plurality of groups of forward gear ratios ranging from a first group including a lowest gear ratio to a highest group including a highest gear ratio with each of said groups having at least one gear ratio manually selectable by an operator and with at least said highest group including sequentially related gear ratios, said drive train including actuator means enabling automatic shifting between the sequentially related gear ratios of at least said highest group, and said control system including means for sensing at least when one of the sequentially related gear ratios of said highest group is manually selected by the operator and operable to enable the actuator means to effect automatic shifting between the sequentially related gear ratios within said highest group when the lowest sequentially related gear ratio within said groups is manually selected by the operator, gear ratio shifts in said highest group comprising the sequence of disengaging a first positive clutch and then engaging a second positive clutch, both of said positive clutches comprising a first clutch member (80, 82, 84) having a fixed rotational speed relative to the rotational speed of the vehicle engine and a second clutch member (86, 88, 90) having a fixed rotational speed relative to vehicle speed;

said method characterized by:
(1) retaining the vehicle master clutch engaged during the gear ratio shift in said highest gear group;
(2) urging said first and second members of said first clutch into a disengaged condition while, in sequence, increasing the supply of fuel supplied to the vehicular engine to cause the engine to rotate at a speed sufficient to cause said first member of said first positive clutch to drive the second member of said first positive clutch and decreasing the supply of fuel to the engine to cause the second member of said first positive clutch to drive the first member of the first positive clutch.

9. The method of claim 8 including the steps of:
(3) sensing if the first positive clutch has been disengaged, and
(4) upon sensing disengagement of said first positive clutch, manipulating the fuel supply to the engine to cause synchronous rotation of the first and second members of the second clutch and then causing engagement thereof.

10. The method of claim 8 including the steps of:
(3) sensing of the first positive clutch has been disengaged, and
(4) if disengagement has not occurred, repeating the steps of urging said first and second members of said first clutch into a disengaged condition while, in sequence, increasing the supply of fuel supplied to the vehicular engine to cause the engine to rotate at a speed sufficient to cause said first member of said first positive clutch to drive the second member of said first positive clutch and then decreasing the supply of fuel to the engine to cause the second member of said first positive clutch to drive the first member of the first positive clutch.

11. The control method of claim 8 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

12. The control method of claim 9 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

13. The control method of claim 10 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

14. A multiple step method for controlling an automatic mechanical vehicle driveline system having a throttle-controlled engine (5), a transmission (2) having a plurality of gear ratio combinations selectively engagable between a transmission input shaft and a transmission output shaft (10), said transmission input shaft being operatively connected to said engine by means of a selectably engagable and disengagable master clutch (8) providing a driving connection between said engine and said input shaft, said automatic mechanical vehicle driveline system comprising an information processing unit (16) having means for receiving a plurality of input signals including (1) input signals (30) indicative of at least one of currently engaged, last engaged and about to be engaged gear ratio of the vehicle driveline; (2) an input signal (14) indicative of the rotational speed of the transmission input shaft; and, (3) an input signal (22) indicative of the rotational speed of the transmission output shaft, said processing unit including means for processing said input signals in accordance with a program and for generating ouptut signals whereby said driveline system is operated in accordance with said program, and means (26 and 34) associated with said driveline system effective to actuate said driveline system to effect engagement of said gear ratio combinations in response to said output signals from said processing unit, a gear ratio change of said driveline system comprising the sequence of disengaging a first positive clutch and then engaging a second positive clutch, both of said positive clutches comprising a first clutch member (80, 82, 84) having a rotational speed dependent on the rotational speed of the vehicle engine and a second clutch member (86, 88, 90) having a fixed rotational speed dependent on vehicle speed;

said method characterized by:
(1) retaining said vehicle master clutch (8) engaged during the gear ratio shift in said drive train;
(2) urging said first and second members of said first clutch into a disengaged condition while, in sequence, increasing the supply of fuel supplied to the vehicular engine to cause the engine to rotate at a speed sufficient to cause said first member of said first positive clutch to drive the second member of said first positive clutch and decreasing the supply of fuel to the engine to cause the second member of said first positive clutch to drive the first member of the first positive clutch.

15. The method of claim 14 including the steps of:
(3) sensing if the first positive clutch has been disengaged, and (4) upon sensing disengagement of said first positive clutch, manipulating the fuel supply to the engine to cause synchronous rotation of the first and second members of the second clutch and then causing engagement thereof.

16. The method of claim 14 including the steps of:
(3) sensing if the first positive clutch has been disengaged, and
(4) if disengagement has not occurred, repeating the steps of urging said first and second members of said first clutch into a disengaged condition while, in sequence, increasing the supply of fuel supplied to the vehicular engine to cause the engine to rotate at a speed sufficient to cause said first member of said first positive clutch to drive the second member of said first positive clutch and then decreasing the supply of fuel to the engine to cause the second member of said first positive clutch to drive the first member of the first positive clutch.

17. The control method of claim 14 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

18. The control method of claim 15 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

19. The control method of claim 16 wherein said sequence to automatically increase and decrease the supply of fuel to the engine is effective to first cause said first clutch member of said first positive clutch to drive the second clutch member thereof and to then cause said second clutch member of said first positive clutch to drive the first clutch member thereof.

* * * * *